(12) United States Patent
Anantharam et al.

(10) Patent No.: US 8,792,489 B2
(45) Date of Patent: Jul. 29, 2014

(54) COMMUNICATION TRANSPORT PROTOCOL FOR DISTRIBUTED INFORMATION TECHNOLOGY ARCHITECTURES

(75) Inventors: Sushma Anantharam, Cupertino, CA (US); Stephan Benny, Sunnyvale, CA (US); Nirapada Ghosh, Sunnyvale, CA (US); Dayavanti G. Kamath, Santa Clara, CA (US); Keshav G. Kamble, Fremont, CA (US); Dar-Ren Leu, San Jose, CA (US); Chandarani J. Mendon, San Jose, CA (US); Nilanjan Mukherjee, Santa Clara, CA (US); Vijoy Pandey, San Jose, CA (US); Nandakumar Peethambaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/434,705

(22) Filed: Mar. 29, 2012

(65) Prior Publication Data

US 2013/0259038 A1    Oct. 3, 2013

(51) Int. Cl.
*H04L 12/28*    (2006.01)
*H04L 12/56*    (2006.01)

(52) U.S. Cl.
USPC ........... 370/390; 370/391; 370/392; 370/393; 370/394; 370/397; 370/398; 370/384; 370/386; 370/401

(58) Field of Classification Search
CPC ........ H04L 12/56; H04L 12/28; H04Q 11/00; H04W 4/00
See application file for complete search history.

(56) References Cited

U.S. PATENT DOCUMENTS

| | | | | |
|---|---|---|---|---|
| 5,461,611 | A  * | 10/1995 | Drake et al. .................. | 370/420 |
| 7,502,366 | B1 * | 3/2009 | Erimli et al. .................. | 370/389 |
| 2012/0069839 | A1* | 3/2012 | Kunz et al. .................... | 370/352 |
| 2012/0078994 | A1* | 3/2012 | Jackowski et al. ............ | 709/202 |

OTHER PUBLICATIONS

Towles, B., "Distributed Router Fabrics", A Dissertation submitted to the Department of Electrical Engineering and the Committee on Graduate Studies of Stanford University, Sep. 2004, pp. i-124, vol. 66/01-B, Stanford University, United States.
Elsayed, T. et al., "ATP: Autonomous Transport Protocol", Proceedings of 2003 IEEE 46th Midwest Symposium on Circuits and Systems, Dec. 30, 2003, pp. 1-30, vol. 1, IEEE, United States.
Moltchanov, D.A., "Transport layer protocols for ad hoc networks", 2009, pp. 1-53, Tampere University of Technology (TUT), Finland.

(Continued)

*Primary Examiner* — Ian N Moore
*Assistant Examiner* — Eric H Wang
(74) *Attorney, Agent, or Firm* — Kenneth L. Sherman, Esq.; Michael Zarrabian, Esq.; Sherman & Zarrabian LLP (57) ABSTRACT

A communication protocol in a layer two (L2) network switch comprises, in response to a service request by a source node, registering the source node for packet communication service. The protocol further comprises forwarding one or more packets from the registered source node to one or more destination nodes. The protocol further comprises receiving packets from one or more destination nodes and forwarding each received packet to a corresponding registered node.

5 Claims, 5 Drawing Sheets

(56) References Cited

OTHER PUBLICATIONS

Anastasi, G. et al., Design and Performance Evaluation of a Transport Protocol for Ad hoc Networks (TPA), The Computer Journal, 2005, pp. 1-25, vol. 00, No. 0, Oxford University Press, United States.

Ganeshkumar, P. et al., "Proposals for Performance Enhancement of Intermediate Node in Ad hoc Transport Protocol", Proceedings of the 2008 International Conference on Computing, Communication and Networking (ICCCN), 2008, pp. 1-5, IEEE, United States.

* cited by examiner

COMMUNICATION TRANSPORT PROTOCOL FOR DISTRIBUTED INFORMATION TECHNOLOGY ARCHITECTURES

BACKGROUND

1. Field of the Invention

The present invention generally relates to data communication, in particular to data communication protocols for distributed information systems.

2. Description of Related Art

Network switching devices are utilized to connect computing systems in a network. Such network switches typically operate at the data link layer (layer 2) of the OSI model, and forward packets from source nodes (devices) to destination nodes in a network.

BRIEF SUMMARY

Embodiments of the present invention relate to a communication transport protocol and system for distributed system information technology architectures. One embodiment provides a method of data communication among nodes in a network. In one embodiment, the network comprises a distributed fabric protocol system.

The method comprises, in a layer two (L2) network switch system, in response to a service request by a source node, registering the source node for packet communication service. The method further comprises forwarding one or more packets from the registered source node to one or more destination nodes. The method further comprises receiving packets from one or more destination nodes and forwarding each received packet to a corresponding registered node.

Registering a source node for packet communication service comprises maintaining a transaction tracking data structure by maintaining a client entry in a client list for the source node. For each client entry, one or more destination entries are maintained in a destination node list wherein each destination entry corresponds to a destination node for the source node. For each destination entry, a list of packet transactions are maintained corresponding to pending packet communications between the source node and the destination node corresponding to the destination entry.

The method further comprises maintaining a transmission queue for enqueuing packets from corresponding registered source nodes for transmission, appending a header to each packet for transmission wherein the header comprises communication protocol information, and updating the transaction tracking data structure based on the packet communication status.

The method further comprises maintaining a receiving queue for enqueuing packets from destination nodes corresponding registered source nodes, and updating the transaction tracking data structure based on received packet communication status.

The method further comprises, in response to a service registration request from a source node, registering a callback function provided by the source node for receiving transmission status information from the system. The callback function provided by a registered source node is utilized for providing transmission status of packets corresponding to the registered source node.

The method further comprises selecting an interface port associated with a destination node, for transmitting a packet from a corresponding source node to the destination node using the selected interface port via a communication link.

The method further comprises receiving a packet from a destination node and enqueuing the packet in the receiving queue for a corresponding source node.

These and other aspects, features and advantages of the invention will be understood with reference to the drawing figure, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Embodiments of the invention provide a communication transport protocol and system for distributed system information technology architectures. One embodiment provides a method of data communication among nodes in a network. In one embodiment, the network comprises a distributed fabric protocol system.

The method comprises, in a layer two (L2) network switch system, in response to a service request by a source node, registering the source node for packet communication service. The method further comprises forwarding one or more packets from the registered source node to one or more destination nodes. The method further comprises receiving packets from one or more destination nodes and forwarding each received packet to a corresponding registered node. The protocol packets are forwarded in L2 domain and the network switch system is a L2 or layer 3 (L3) capable network device.

Registering a source node for packet communication service comprises maintaining a transaction tracking data structure by maintaining a client entry in a client list for the source node. For each client entry, one or more destination entries are maintained in a destination node list wherein each destination entry corresponds to a destination node for the source node. For each destination entry, a list of packet transactions are maintained corresponding to pending packet communications between the source node and the destination node corresponding to the destination entry.

The method further comprises maintaining a transmission queue for enqueuing packets from corresponding registered source nodes for transmission, appending a header to each packet for transmission wherein the header comprises communication protocol information, and updating the transaction tracking data structure based on the packet communication status.

The method further comprises maintaining a receiving queue for enqueuing packets from destination nodes corresponding registered source nodes, and updating the transaction tracking data structure based on received packet communication status.

The method further comprises, in response to a service registration request from a source node, registering a callback function provided by the source node that would be invoked when a packet is received for this source node. The callback function provided by a registered source node is utilized for processing the received packet for the source node.

The method further comprises selecting an interface port associated with a destination node, for transmitting a packet from a corresponding source node to the destination node using the selected interface port via a communication link. The method further comprises receiving a packet from a destination node and enqueuing the packet in the receiving queue for a corresponding source node. Exemplary embodiments of a communication transport protocol system according to the present invention are described hereinbelow in relation to the drawings. In one embodiment, the communication transport protocol system comprises a computer networking device (network switch) that connects computing systems or network segments such as different types of networks. An embodiment comprises a multi-port network device that processes and routes data at the data link layer (layer 2 of the OSI model).

Figure 1:
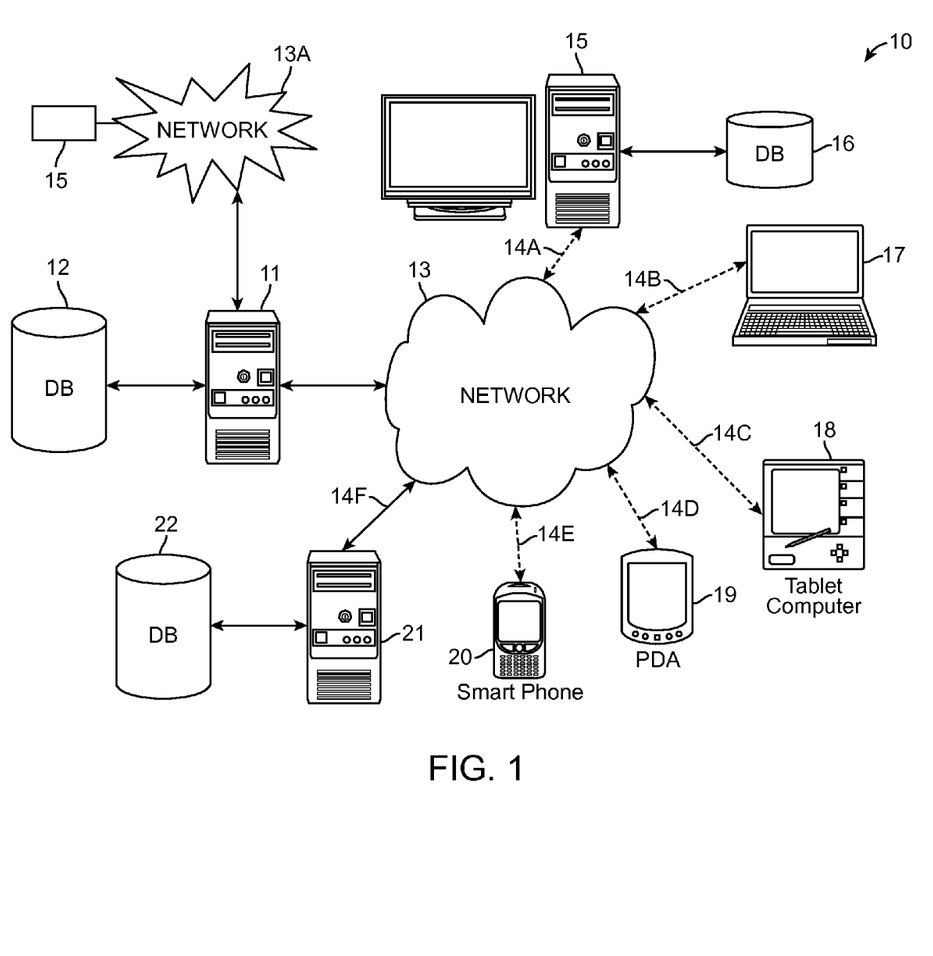
FIG. 1 illustrates an example of the basic components of an information technology system 10 utilizing a communication transport protocol, according to an embodiment of the present invention.

Referring to the drawings, in which like numerals illustrate like elements throughout the several views, FIG. 1 illustrates an example of the basic components of an information technology system 10 utilizing a communication transport protocol according to an embodiment of the present invention. The system 10 includes a computer networking device 11 and the remote devices 15 and 17-20 that utilize a communication transport protocol system 100 (FIG. 2) of the computer networking device 11 implementing a communication transport protocol, according to an embodiment of the present invention.

Each of the remote devices 15 and 17-20 has applications and can have a local database 16. The computer networking device 11 contains a communication transport protocol. In one implementation, the server 11 executes software for a computer network. In one embodiment, the computer networking device 11 connects network segments 13 and 13A.

A database 12 that can be accessed by remote device 15 and 17-20 via connections 14(A-F), respectively, over a network 13. The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The computer networking device 11 may also be connected to the LAN within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. When a user at one of the remote devices 15 and 17-20 desires to access data from the database 12, the remote device 15 and 17-20 communicate over the network 13, to access the database 12.

Data that is obtained from third party computer systems 21 and database 22 can be stored on the database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
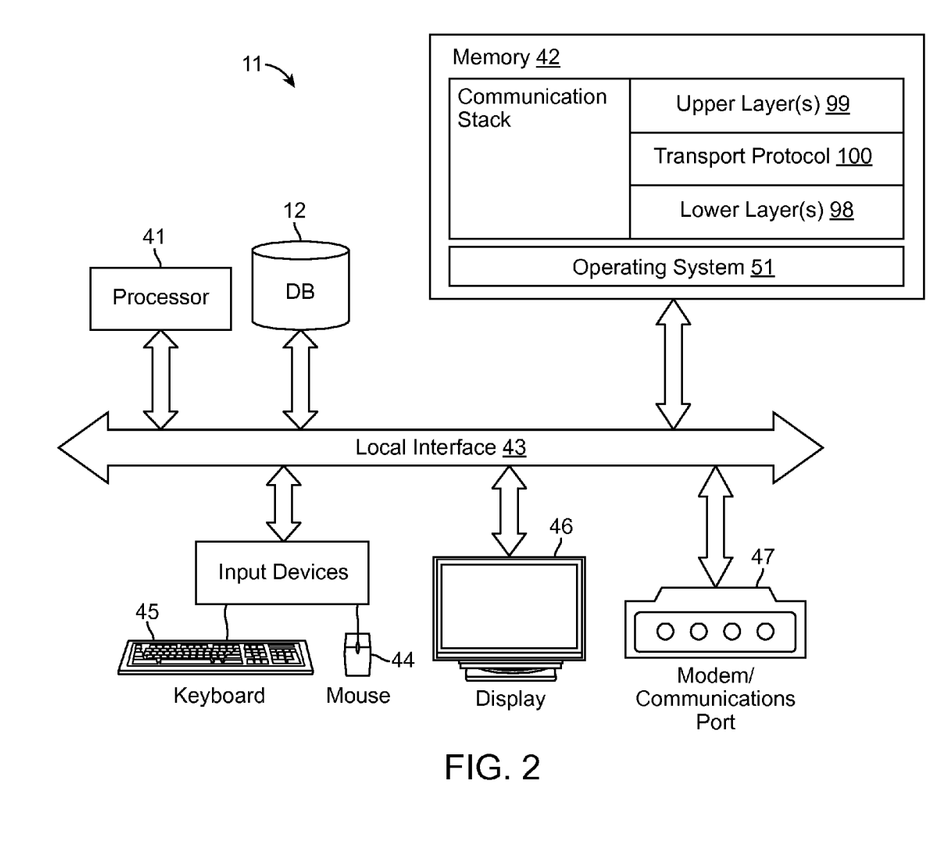
FIG. 2 is a block diagram demonstrating an example of a computer networking device as shown in FIG. 1, utilizing communication transport protocol system, according to an embodiment of the present invention.

Illustrated in FIG. 2 is a block diagram demonstrating an example of the computer networking device 11, as shown in FIG. 1, utilizing communication transport protocol system 100 according to an embodiment of the present invention.

In one example, in terms of hardware architecture, as shown in FIG. 2, the computer networking device 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the computer networking device 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the system 100 of the present invention. The system 100 comprises functional components and process blocks described further below.

The O/S 51 essentially controls the execution of other computer programs, such as a communication stack including the communication transport protocol system 100, and provides scheduling, I/O control, file and data management, memory management, and communication control and related services. However, the communication transport protocol system 100 of the present invention is applicable on other operating systems.

The communication stack includes multiple layers, including upper layer protocols (ULPs) 99, such as any layer above layer 2, the communication transport protocol layer 100 and lower layers 98, such as any layer below layer 2.

The communication transport protocol system 100 may comprise a source program, executable program (object code), script, or any other entity comprising a set of computer program instructions to be performed. When the communication transport protocol system 100 is a source program, then the program is usually translated via a compiler, assembler, interpreter, or the like, which may or may not be included within the memory 42, so as to operate properly in connection with the O/S 51. Furthermore, the communication transport protocol system 100 can be written as (a) an object oriented programming language, which has classes of data and methods, or (b) a procedure programming language, which has routines, subroutines, and/or functions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a RF or other transceiver (not shown), a telephonic interface (not shown), a bridge (not shown), a router (not shown), etc.

If the computer networking device 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the computer networking device 11 is activated.

When the computer networking device 11 is in operation, the processor 41 is configured to execute software stored within the memory 42, to communicate data to and from the memory 42, and generally to control operations of the computer networking device 11 pursuant to the software. The system 100 and the O/S 51 are read, in whole or in part, by the processor 41, perhaps buffered within the processor 41, and then executed.

When the communication transport protocol system 100 is implemented in software, as is shown in FIG. 2, it should be noted that the communication transport protocol system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a RAM (electronic), a ROM (electronic), an EPROM, EEPROM, or Flash memory (electronic), an optical fiber (optical), and a portable CDROM, CD R/W (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In an alternative embodiment, where the communication transport protocol system 100 is implemented in hardware, the communication transport protocol system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As noted, an embodiment of the computer networking device 11 comprises a multi-port network device that processes and routes data at the data link layer (layer 2 of the OSI model), utilizing a layer 2 (L2) transport protocol and mechanism, according to an embodiment of the invention. One implementation of the system 100 in the device 11 comprises an Ethernet based L2 transport (EL2T) communication protocol system for distributed system architectures such as a distributed fabric protocol (DFP) system (in one example, the system 10 comprises a DFP system). In one embodiment, the EL2T system functions as a logical replacement of a transport protocol module wherein systems (nodes) utilizing the EL2T system can communicate with other systems without concern about actual communication details such as packet structure used in transmission.

In a DFP system including a computer networking device 11, all the nodes connected to a DFP system utilize the EL2T system which provides communication services including transmission failure detection and retransmission. The EL2T system provides upper layer protocols (e.g., ULPs 99) an efficient mechanism of communicating with other nodes. Such ULPs register with the EL2T system for service, and request communication services which the EL2T system handles as described herein.

Figure 3:
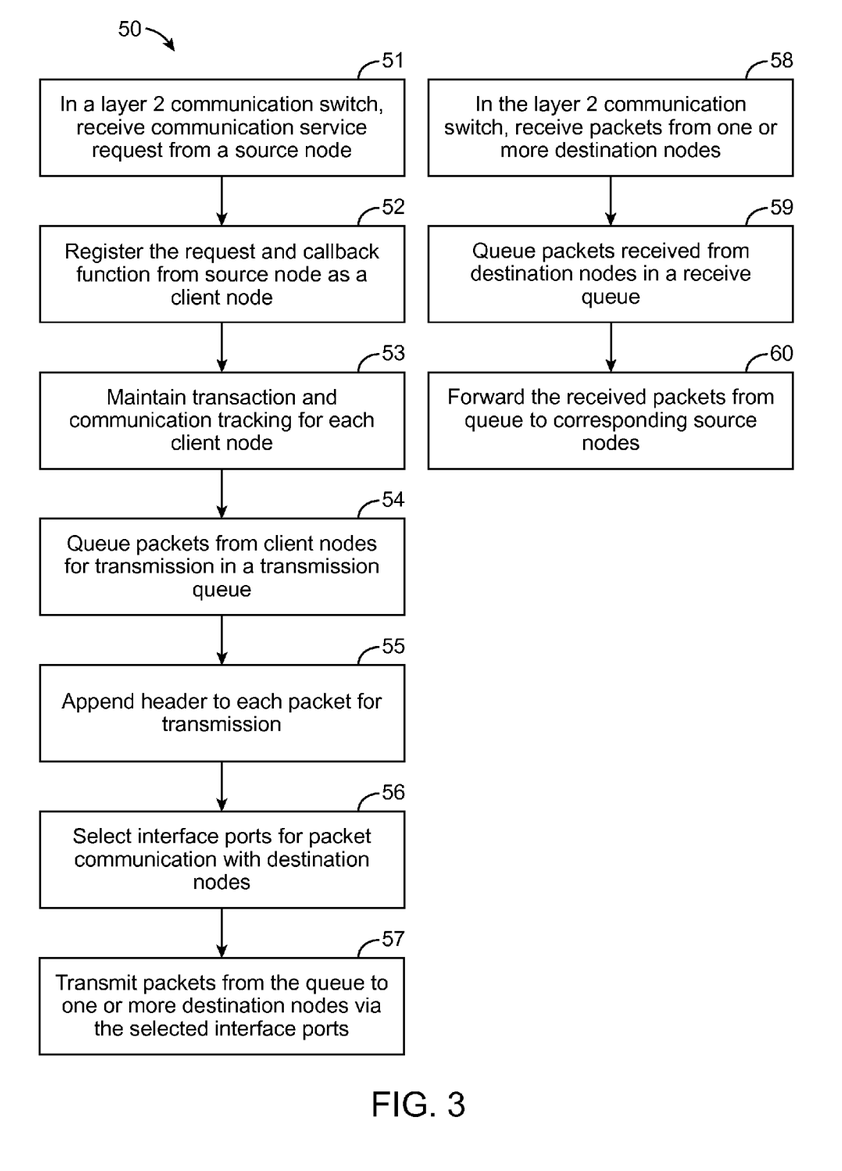
FIG. 3 shows a flowchart of a process for data communication among nodes in a DFP network, according to an embodiment of the invention.

FIG. 3 shows a flowchart of a process 50 for data communication among nodes in a DFP network, according to an embodiment of the invention. According to process block 51, in a layer two (L2) network device, a packet communication service request is received from a source node.

According to process block 52, in response to the request, the source node is registered as a client node for packet communication service (a callback function provided by the source node is registered for receiving transmission status information from the system). In one embodiment, registering a source node for packet communication service further comprises maintaining a transaction tracking data structure including a client entry in a client list for the source node, according to process block 53. For each client entry, there are one or more destination entries in a destination node list wherein each destination entry corresponds to a destination node for the source node. For each destination entry, there is a list of packet transactions corresponding to pending packet communications between the source node and the destination node corresponding to the destination entry.

According to process block 54, a transmission queue is used for enqueuing packets from corresponding registered source nodes (i.e., client nodes) for transmission.

For packet transmission, according to process block 55, a header is appended to each packet for transmission wherein the header comprises communication protocol information (the transaction tracking data structure is updated based on the packet communication status).

According to process block 56, an interface port associated with a destination node is selected for transmitting a packet from a corresponding source node to the destination node using the selected interface port via a communication link.

According to process block 57, one or more packets are transmitted from the queue to one or more destination nodes via the selected interfaces.

In packet reception, according to process block 58, packets are received from one or more destination nodes. A receiving queue is used for enqueuing packets from destination nodes corresponding registered source nodes. The transaction tracking data structure is updated based on received packet communication status.

According to process block 59, received packets from a destination node are enqueued in the receiving queue for a corresponding source node.

According to process block 60, each received packet is forwarded to a corresponding registered node (the callback function provided by a registered source node is used for providing transmission information for packets corresponding to the registered source node).

Figure 4:
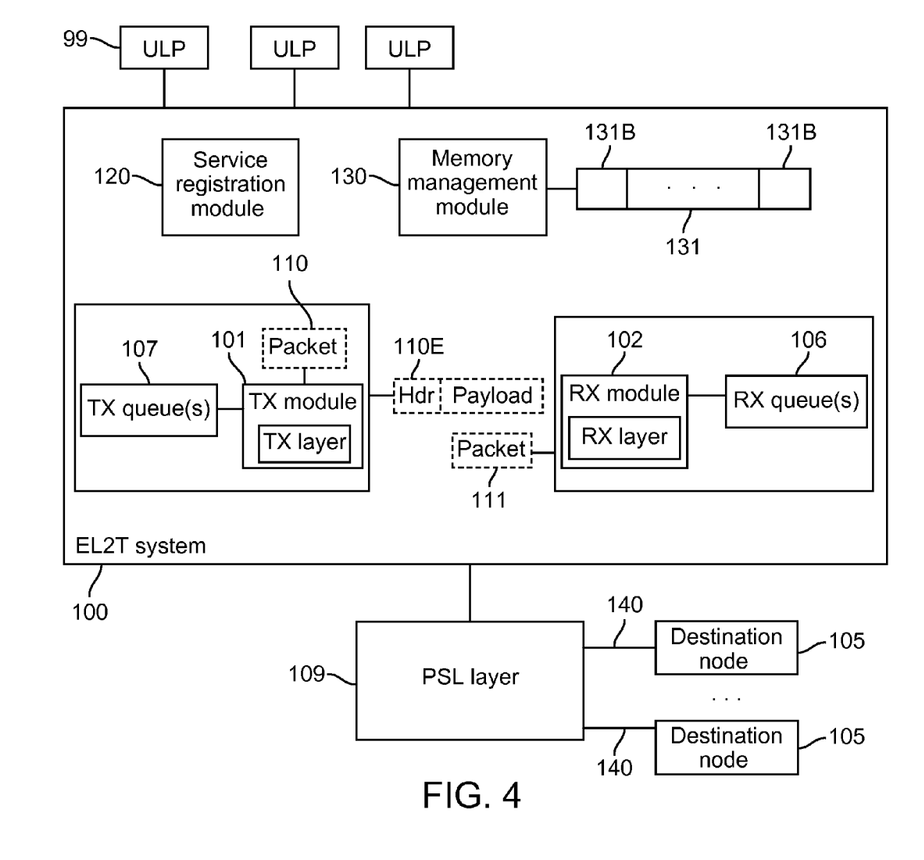
FIG. 4 shows a communication protocol architecture in a communication stack including multiple functional layers, according to an embodiment of the invention.
Figure 5:
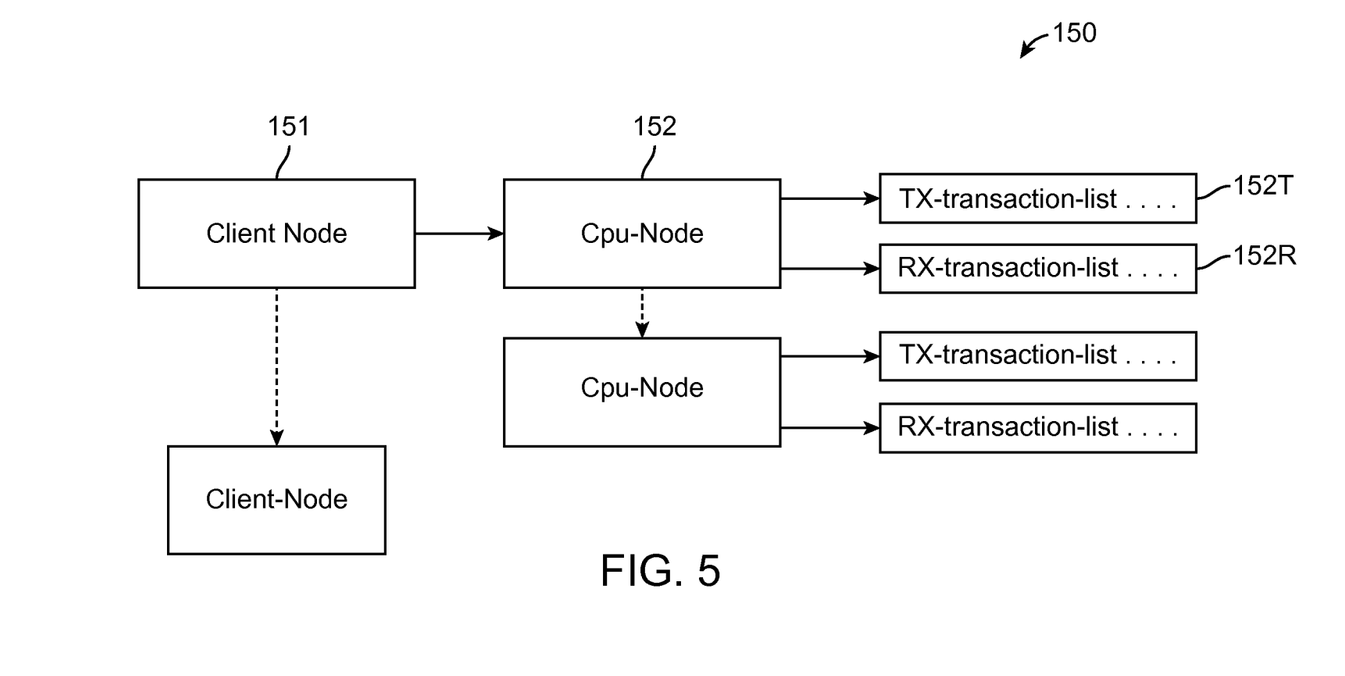
FIG. 5 shows an execution and data model for a communication protocol according to an embodiment invention.

FIG. 4 shows a communication protocol architecture for the EL2T system 100 in a communication stack including multiple functional layers, according to an embodiment of the invention. FIG. 5 shows an execution and data model 150 for the EL2T system 100, according to an embodiment invention. The EL2T system includes two primary communication modules, one for data transmission (TX layer 101) and one for data receiving (RX layer 102). The EL2T system 100 creates a client node 151 every time ULP 99 registers with the EL2T system 100 for service. Each client node 151 corresponds to a ULP 99 registering with the EL2T system 100 for service.

Each client node (Client Node) 151 has one or more cpu nodes (Cpu_Node) 152 associated with it. A Cpu node 152 designates one destination node for communication with the client node 151 (corresponding to a registered ULP). One client node 151 may need to communicate with multiple destination nodes in the system 10 at the same time. As such, the EL2T system creates a Cpu node 152 for each destination node. To keep track of transmission (TX) and reception (RX) transactions for each Cpu node 152, the EL2T system utilizes a TX transactions list (TX-transactions list) 152T and a RX transactions list (TX-transactions list) 152R, respectively.

During processing, a TX thread (process) of the TX layer 101 parses through all TX transaction lists of all the cpu nodes, and a RX thread of the RX layer 102 process through all RX transaction lists of all the cpu nodes. The TX and RX threads check for status of packet transmissions, time outs, and retransmissions as needed, on behalf of the registered ULPs. If the number of retransmissions exceeds a threshold, then the transmission is reported as a failure to the corresponding ULP that registered for service with the EL2T system.

In one implementation, the EL2T system provides a transport protocol for a DFP system, with efficient, low overhead, low latency and as a reliable layer 2 communication transport protocol in distributed system architectures such as in Blade switch applications. In one example, the EL2T protocol provides transport protocol for DFP implementation, treating a packet as a character buffer without requiring knowledge of any packet structure for communication. As such, according to an embodiment of the invention, the EL2T system functions as a logical replacement of a conventional communication layer used as a transport for communicating with multiple devices in a communication stack. The EL2T system masks accounting of how actual communication takes place from said multiple devices.

Execution Model

A ULP (i.e., client), requiring EL2T service, registers with a service registration module 120 of the EL2T system 100, for the service such as by calling a el2t_register( ) function of the registration module 120. The client passes along a clientId and a callback routine for that client (a client node is created upon registration (FIG. 5)). After registration, the client can begin sending and receiving EL2T packets. The clients registering with a NULL callback routine cannot receive EL2T packets, as the callback routine is the routine that would have been responsible to deal with those received packets As noted, in one embodiment, an EL2T protocol of the EL2T system utilizes two communication modules (TX layer 101 and RX layer 102) in a communication operation. The TX layer 101 implements a transmission process (TX thread), and RX layer 102 implements a receiving process (RX thread). In one example, the TX thread comprises a pthread EL2T_TX, and the RX thread comprises a pthread EL2T_RX. Said processes are created statically when the system is booted up.

The TX thread is responsible for transmitting a message (e.g., packet) from a ULP 99 (i.e., client node 151) to a destination node 105 on a communication link, starting a timer to wait for an ACK (acknowledgement) message and retransmit the message if the ACK was not received in time. In one example, a destination node 105 comprises a system 15 in FIG. 1. The RX thread is responsible for receiving a message from a destination node 105 and forwarding it on to a respective client node 151 for that message. When the RX thread receives an ACK from the client node 151 in response to the forwarded message, the RX thread cancels said timer and a corresponding thread that initiated the packet transmit, is woken up with a wake-up message (e.g., ST_MSGCMD_WAKEUP). The wake-up message indicates if the message communication operation was a failure or a success.

In one example, The EL2T system 100 maintains a list 150 of ordered registered clients 151 based on priority, and a list of Cpu nodes 152 for each client 151. The list of Cpu nodes is maintained as an array of client-cpu data structures for the clients. Cpu-related information for each array entry includes an identification CpuId, a flag indicating if it is currently a valid entry, a RX transaction queue (RX queue) 106 and a TX transaction queue (TX queue) 107. CpuId and a corresponding key are maintained in a Cpu-database managed by higher layer protocol, such as a Switch Discovery Protocol (SDP).

The RX queue corresponds to the RX thread, and the TX queue corresponds to the TX thread. The RX and TX threads are always ready to perform their functions but not busy waiting. Each of the RX and TX threads waits on its respective count semaphore which is incremented whenever a message is queued in its queue (i.e., RX queue and TX queue, respectively) and decremented accordingly when a message is dequeued and processed thereafter A Path Selection Layer (PSL) 109 according to the present invention receives packets from destination nodes. An EL2T packet received from a PSL 109 is enqueued in the corresponding RX queue 106, wherein the packet is in turn processed by the RX thread.

The proper TX queue for a packet to be transmitted, and the proper RX queue for a received packet, is determined using a ClientId and a CpuId which are available from the caller process for data transmission (TX) or a packet for data receiving (RX).

The TX thread processes a packet transaction by performing packet transmission (i.e., dispatching to the proper PSL application programming interface (API)), and retransmission as needed. In one example, retransmission is attempted three times before a failure is declared to a corresponding ULP. Retransmission includes starting a timer when transmitting, wherein if an ACK is received from a destination node within a time-limit, the RX thread cancels the timer. Otherwise, expiry of the timer triggers retransmission by TX thread again.

For a given (ClientId, CpuId) pair, there can be only one packet transmission outstanding. As such, transmission for the next packet, even though it may be queued in the TX queue, is not attempted when a transmitted packet is not acknowledged or declared as failed.

Packet Transmission

The TX thread selects which packet transaction to process next, by examining the queues 107 for all client nodes 151 to find a transaction that needs to be transmitted. The TX thread waits for a count semaphore such as tx_cnt_semaphore, before proceeding with transmission for a selected transaction. When the count semaphore indicates the TX thread can proceed, the TX thread utilizes the clientId stored in minClientId which maintains the first clientId in order of priority, for the selected transaction to be processed.

For a packet transaction, the TX thread appends an EL2T header (Hdr) to an incoming packet 110 from a client node 151, wherein the EL2T header includes a protocol type-length-value (TLV) for EL2T, and further information to keep track of clientId, transaction number, etc. The resulting EL2T packet 110E includes a said header and payload information from the incoming packet. In a data communication protocol, optional information may be encoded as a TLV element in the protocol.

The TX thread transmits the EL2T packet 110E using an application interface of the PSL 109, such as PSL_tx API, starts said timer, changes the state of the transaction to IN_PROGRESS and maintains a count semaphore. If a transaction is in a COMPLETED state, the TX thread wakes up a caller-thread (i.e., callback routine) passed by the client 151 that registered for packet transmission of the packet 110E. The TX thread then removes the transaction from the transaction list 152T for the client node 151 (and the transmitted packet is de-queued).

Upon expiry of the timer, if said count semaphore is not exceeding a threshold such as MAX_RETRY, a timer callback routine that is passed when timer is started, triggers the next retry and restarts the timer if required.

Once the selected transaction is processed, the TX thread proceeds to a next client node 151 in priority order for a next transaction (if minClientId is unchanged) or else proceeds to a changed minClientId. And so on.

Packet Reception

The PSL layer 109 uses packet information (e.g., from received packets 111) to queue the packets into the appropriate RX queues 106 via callback routines that were provided by client nodes 151 when registering for EL2T service with the EL2T system 100.

The RX thread examines the RX queues 106 and processes RX transactions in them one by one. The RX thread follows similar steps as the TX thread in determining which client node 151 to process first by selecting a packet from the RX queues 106. If the selected packet is an ACK request, the RX thread cancels the corresponding transmission timer set by the TX thread, and marks the corresponding TX transaction COMPLETED. If the selected packet is not an ACK request, then the RX thread queues a corresponding ACK-packet in the TX queue 107 for the associated client node 151 and invokes the callback routine provided by the associated client node 151 (this callback was passed when client registered for EL2T service).

Packet Allocation

The EL2T system 100 further includes a memory management module 130 that provides memory management APIs for a memory allocation function (e.g., EL2T_alloc( )) and a de-allocation function (e.g., EL2T_free( )). As such, the EL2T system manages its buffer memory pool 131. The allocation function is for the ULPs to call for allocating a buffer for packet transmission. The allocation function returns a buffer pointer to a memory block 131B where a ULP can place its payload. The allocation function reserves the space for an EL2T packet header at the beginning of the buffer, wherein the ULPs need not mange the allocated space so long as the ULPs call the de-allocation function. In one example, the EL2T system 100 pre-allocates a number of the memory blocks to be managed. A ULP uses and a de-allocation function to free an allocated buffer.

Communication with ULP

A ULP communicates with the EL2T system via a EL2T API layer for packet transmission (i.e., TX layer), and via a callback function (i.e., RX layer) when a packet 110 is received for the ULP. The completion of transmission is indicated by a message sent to the caller thread.

A ULP also communicates with the EL2T system 100 via el2t_register( ) and el2t_unregister( ) function calls which provide registration and un-registration services described above for the service registration module in FIG. 4.

A ULP also uses el2t_pkt_malloc( ) and el2t_pkt_free( ) APIs that are provided by EL2T, which provide memory allocation and de-allocation functions described above in relation to the memory management module in FIG. 4.

Communication with PSL

The EL2T system 100 communicates with the PSL layer 109 by registering for PSL layer service. The EL2T system 100 registers and unregisters with PSL 109 via psl_register( ) and psl_unregister( ) API calls provided by the PSL layer 109, respectively. Generally the PSL layer 109 assists the EL2T system 100 in determining which among multiple interfaces 140 to use when sending out packets and which client node 151 to send a packet to when it arrives. As such, the ULP need not be concerned with which interface is used. Examples of said interfaces include management port interface and data port interface (a data port has its own driver and a management port has its own driver). Depending on destination address, the PSL layer 109 determines which path to take (e.g., management port interface or data port interface). For registration with the PSL layer 109, the EL2T system 100 passes its protocol type while registering with the PSL layer, and passes a callback for reception of the messages for itself.

For transmission, the EL2T system 100 uses a function such as psl_tx( ). For receiving, the EL2T system 100 communicates via callback function which was supplied with registration. PSL is a registration based service, similar to EL2T. As such, EL2T is one of the clients of PSL, wherein the PSL identifies its clients by a protocol identifier.

State Machine

For TX and RX transactions in the transaction lists 152T, 152R, in one embodiment the EL2T system 100 utilizes a state machine model. When a transaction is created, the transaction queued and is tagged as ENQUEUED state, When the transaction is being processed, the transaction moves to IN_PROGRESS state. The transaction stays in that state when wait-for-ACK/retransmission is ongoing. When that is done (or max retry is reached), the transaction goes to a COMPLETED state and it is deleted in the next round. In one embodiment, the EL2T system 100 maintains statistics of all packets received and transmitted per client node 151 per Cpu node 152.

Data Structures

Tables 1-7, below illustrate example data structure and functions employed by the EL2T system 100 and protocol layers (e.g., FIGS. 3-4), according to an embodiment of the invention. Table 1 shows an example data structure for client nodes managed by the EL2T system.

TABLE 1

```
typedef struct el2t_client {
    int      client_id;        /* statically assigned id */
    unsigned int client_flags;  /* client specific attributes
                                       e.g. pthread or not ? */
    int priority;
    el2t_cpu_t el2t_cpu[CPUDB_CPU_MAX];   /* Per CPU info */
    el2t_client_cb ulp_cb;   /* Callback for the client */
    void *cb_args;           /* Passed to callback */
    struct el2t_client *next, *prev; /* list of clients */
} el2t_client_t;
```

Table 2 shows an example data structure for CPU specific information associated to a client.

TABLE 2

```
/* CPU specific information associated to a client */
typedef volatile struct el2t_client_cpu {
    int           cpu_id;
    cpu_info_t    * cpu_info; /* pointer to relevant cpu node */
    uint32        cpu_flags; /* VALID, NO_ACK_REQD etc. */
    el2t_client_t * client;
    mutex_t         rx_mutex;
    el2t_rx_trans_t * rx_head;   /* RX transaction linked list head */
    el2t_rx_trans_t * rx_tail;   /* Tail for RX trans list */
    mutex_t         tx_mutex;
    el2t_tx_trans_t * tx_head;   /* TX trans linked list head */
    el2t_tx_trans_t * tx_tail;   /* TX trans linked list tail */
    uint16        last_seq_sent;/* last Sequence number sent */
    uint16        last_seq_recv;/* last RX Sequence number received */
    uint16        last_ack_recv;/* last ACK number received */
} el2t_cpu_t;
```

Table 3 shows an example data structure for EL2T Header, used in EL2T transmission.

TABLE 3

```
/* EL2T Header - used for EL2T transmission */
    typedef   tlv_ {
        uint8    proto_type;
        uint16   proto_len;
        int      proto_value;
    } TLV;
```

TABLE 3-continued

```
typedef struct el2t_pkt_ {
    uint8    dest_mac;
    uint8    src_mac;
    uint16   ether_type; /* 0x88b7 */
typedef volatile struct el2t_hdr {
    TLV      el2t_tlv;
    uint16   el2t_rev;
    int      client_id;
    uint16   hdr_flags; /* NO_ACK_REQD, etc */
    uint16   seq_no;
    uint16   payload_len;
} el2t_hdr_t;
```

Table 4 shows an example data structure for RX transactions.

TABLE 4

```
/* RX transactions */
typedef volatile struct el2t_rx_trans_s {
    el2t_hdr_t  el2t_hdr;
    int         src_cpu;
    int         ack_sent_cnt;  /* Number of times an ACK sent */
    uint8       *ack_data;     /* This transaction's ACK packet */
    el2t_pkt_t  *pkt;          /* Pkt for data*/
    sal_usecs_t rcvd_time;     /* When was it received */
    uint32 rx_state; /* ENQUEUED, IN_PROGRESS, COMPLETED */
    el2t_client_t  *client; /* associated client */
    el2t_rx_trans_t *next;
    el2t_rx_trans_t *prev;
};
```

Table 5 shows an example data structure for TX transactions.

TABLE 5

```
/* TX transactions */
typedef volatile struct el2t_tx_trans_s {
    el2t_hdr_t  el2t_hdr;   /* Basic header for the transaction */
    int         dest_cpu;   /* Where's it going */
    uint8       *pkt_buf;   /* Pointer to original data */
    int         len;        /* Length of payload */
    int         tx_count;   /* How many times sent */
    sal_usecs_t last_tx;    /* Last time sent */
    uint32      tx_state;   /* ENQUEUED, IN_PROGRESS,
                               COMPLETED */
    el2t_client_t  * client;     /* Controlling client */
    el2t_tx_trans_t * next;      /* Linked lists of transactions */
    el2t_tx_trans_t * prev;      /* for de-queuing */
};
```

Application Programming Interfaces

TABLE 6

```
EL2T_register(int clientId, int priority, uint32 flags, el2t_client_cb_t
callback, void *cookie)
    Purpose : Registration for EL2T service.
    Arguments:
        clientId : client id registering for EL2T service
        priority : priority of the client
        flags: flags indicating characteristics of this client, e.g.
            NO_ACK_REQD
        callback : callback that needs to be invoked when a packet is received
            for this client.
        Cookie: parameter that need to be passed to callback.
EL2T_unregister (int clientId)
    Purpose : Unregister for EL2T service.
    Arguments:
            clientId : client id registered for EL2T service
EL2T_tx(cpu_info *dest_cpu, int client_id, el2t_ack_cb *cb,
char *pkt_data, int len)
    Purpose: Queues request into the api queue for transmission. EL2T api
        thread will queue this request into the right tx
```

TABLE 6-continued

```
        transaction queue.
    Arguments:
        Dest_cpu : target cpu for the request
        Client_id : client_id for the request passed.
        Cb: callback to be called when an ack is received for this request
        Pkt_data : pointer to the packet
        Len : length of the packet to be sent.
EL2T_init( )
    Purpose: Initializes any relevant data structures required for EL2T.
EL2T_start( )
    Purpose: Starts all the threads needed for EL2T.
EL2T_stop
    Purpose: Stops all EL2T threads.
```

In Table 6, EL2T_register API is used by a ULP as a client for registering with the EL2T system, and includes a clientId parameter provided by the client as a unique identification for the EL2T system to identify a registering client. The flags parameter allows the client to specify if acknowledgment is required. The callback parameter provides a function that is invoked by the EL2T system when packet is received for the client (e.g., RX callback). The cookie parameter allows the EL2T system to pass information to the client using the callback function. Similarly, EL2T_tx function may have a parameter for invocation by the EL2T system in case of errors in retransmission.

The ULP uses EL2T_unregister API when it no longer needs EL2T service.

Table 7 shows a list of example PSL communication APIs for use by the EL2T system.

TABLE 7

```
PSL_register(int clientId, uin32 flags, el2t_client_cb_t callback,
void *cookie)
    Purpose : Registration for PSL service.
    Arguments:
        clientId : client id registering for PSL service, this would be
            fixed client ID for EL2T.
        flags:    Flags indicating characteristics of this client,
        e.g. NO_ACK_REQD, PTHREAD_OR_NOT etc.
        callback : callback that needs to be invoked when a packet is received
            for this client.
        Cookie: parameter that need to be passed to callback.
PSL_unregister(int clientId)
    Purpose : Unregister from PSL service.
    Arguments:
        clientId : client id registered for EL2T service.
PSL_tx(int dest_cpu, char *pkt_data, int len)
    Purpose: Sends out the input packet to the input destination cpu.
    Arguments:
        Dest_cpu : target cpu for the request
        Pkt_data : pointer to the packet
        Len : length of the packet to be sent.
```

The EL2T system registers with the PSL layer for service using PSL_register API for, similar to the way a ULP registers with the EL2T system, using similar parameters.

An embodiment of the EL2T system is useful for a data center switching system for data communication, such a for top-of-rack and blade server switches, used in server, storage and networking infrastructure for information technology enterprise data centers. In one implementation, the EL2T system allows multiple physical routers to functionally appear as one logical switch, which is expandable for additional physical routers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A network switch system for data communication between nodes in a network, comprising:
    a service registration module that registers one or more source node for packet communication service;
    a transmission module that forwards one or more packets from a registered source node to one or more destination nodes;
    a receiving module that routes one or more packets from one or more destination nodes to a registered source node;
    wherein the protocol packets are forwarded in layer two (L2) domain and the network switch system is a L2 or layer 3 (L3) capable network device,
    wherein the transmission module maintains a transmission queue for enqueuing packets from corresponding registered source nodes for transmission, the transmission module appends an header to each packet for transmission wherein the header comprises communication protocol information, and the receiving module maintains a receiving queue for enqueuing packets from destination nodes corresponding to registered source nodes; and
    a selection module that selects an interface port associated with a destination node, wherein the transmission module transmits a packet from a corresponding source node to the destination node using the selected interface port via a communication link, and the selection module receives a packet from a destination node and enqueues the packet in the receiving queue for a corresponding source node.

2. The system of claim 1, wherein:
    upon a lack of acknowledgment from a destination node in reply to a packet transmission, the transmission module retransmits a packet at least once before declaring transmission failure to a corresponding registered source node.

3. The system of claim 1, wherein:
    in response to a service registration request from a source node, the service registration module registers a callback function provided by the source node for receiving transmission information from the system.

4. The system of claim 3, wherein:
    the transmission module utilizes the callback function provided by a registered source node for providing transmission status of packets corresponding to the registered source node.

5. A computer program product for data communication among nodes in a network, comprising:
    a non-transitory computer usable medium having computer readable program code embodied therewith, wherein the computer readable program code when executed on the computer causes the computer to perform operations comprising:
    in a network switch system, in response to a service request by a source node, registering the source node for packet communication service;
    forwarding one or more packets from the registered source node to one or more destination nodes; and
    receiving packets from one or more destination nodes and forwarding each received packet to a corresponding registered node;
    wherein the packet is forwarded in layer two (L2) domain and network switch system can be L2 or layer three (L3) network device,
    wherein the program code further causes the computer to perform operations further comprising:
    maintaining a transaction tracking data structure by:
        maintaining a client entry in a client list for the source node;
        for each client entry, maintaining one or more destination entries in a destination node list wherein each destination entry corresponds to a destination node for the source node;
        for each destination entry, maintaining a list of packet transactions corresponding to pending packet communications between the source node and the destination node corresponding to the destination entry;
        maintaining a transmission queue for enqueuing packets from corresponding registered source nodes for transmission;
        appending a header to each packet for transmission wherein the header comprises communication protocol information; and
        updating the transaction tracking data structure based on the packet communication status; and
    selecting an interface port associated with a destination node, for transmitting a packet from a corresponding source node to the destination node using the selected interface port via a communication link;
    maintaining a receiving queue for enqueuing packets from destination nodes corresponding registered source nodes;
    receiving a packet from a destination node and enqueuing the packet in the receiving queue for a corresponding source node;
    updating the transaction tracking data structure based on received packet communication status;

registering a callback function provided by the source node for receiving transmission status information from the system; and utilizing the callback function provided by a registered source node for providing transmission information corresponding to the registered source node.

* * * * *